United States Patent
Ikeda (10) Patent No.: US 11,932,341 B2
(45) Date of Patent: Mar. 19, 2024

(54) RIDE, STRADDLE VEHICLE, AND ADJUSTMENT METHOD

(71) Applicant: KAWASAKI MOTORS, LTD., Akashi (JP)

(72) Inventor: Shinji Ikeda, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 51 days.

(21) Appl. No.: 17/658,756

(22) Filed: Apr. 11, 2022

(65) Prior Publication Data
US 2022/0324528 A1 Oct. 13, 2022

(30) Foreign Application Priority Data
Apr. 12, 2021 (JP) .................. 2021-067411

(51) Int. Cl.
| | |
|---|---|
| *B62J 6/022* | (2020.01) |
| *B60Q 1/068* | (2006.01) |
| *B62J 6/025* | (2020.01) |
| *B62J 6/027* | (2020.01) |
| *B62J 45/42* | (2020.01) |
| *F21S 41/141* | (2018.01) |
| *F21W 107/17* | (2018.01) |
| *F21Y 115/10* | (2016.01) |

(52) U.S. Cl.
CPC ............ *B62J 6/022* (2020.02); *B60Q 1/0683* (2013.01); *B62J 6/025* (2020.02); *B62J 6/027* (2020.02); *B62J 45/42* (2020.02); *F21S 41/141* (2018.01); *F21W 2107/17* (2018.01); *F21Y 2115/10* (2016.08)

(58) Field of Classification Search
CPC ....... B60Q 1/0683; F21S 41/141; B62J 45/42; B62J 6/022; B62J 6/025; B62J 6/027
See application file for complete search history.

(56) References Cited

U.S. PATENT DOCUMENTS

| | | | |
|---|---|---|---|
| 5,647,659 A * | 7/1997 | Mori | B60Q 1/0683 |
| | | | 362/524 |
| 2018/0162265 A1* | 6/2018 | Iwamoto | B62J 6/026 |
| 2018/0264993 A1* | 9/2018 | Takenaka | F21S 41/143 |

FOREIGN PATENT DOCUMENTS

| | | |
|---|---|---|
| CN | 208687627 | 4/2019 |
| EP | 3 121 097 | 1/2017 |
| EP | 3 453 600 | 3/2019 |
| JP | 61-43237 | 3/1986 |
| JP | 2001-158390 | 6/2001 |
| JP | 2019-48554 | 3/2019 |
| WO | 2015/140380 | 9/2015 |

* cited by examiner

*Primary Examiner* — Evan P Dzierzynski
*Assistant Examiner* — Nathaniel J Lee
(74) *Attorney, Agent, or Firm* — Fay Kaplun & Marcin, LLP (57) ABSTRACT

A ride includes a first device and a second device. The first device has an adjustment mechanism. The second device has an adjustment mechanism. Any one of the first device and the second device is a lighting device in which a direction of a light source of light is adjustable. An opening is formed in the ride. The adjustment mechanism of the first device and the adjustment of the second device can be operated by being accessed from outside through the same opening.

12 Claims, 8 Drawing Sheets

RIDE, STRADDLE VEHICLE, AND ADJUSTMENT METHOD

TECHNICAL FIELD

This invention relates to a ride in which a plurality of devices, including a lighting device, are adjustable.

BACKGROUND ART

PTL 1 discloses a motorcycle including a headlight that illuminates the front and a radar device that detects the front.

PRIOR-ART DOCUMENTS

Patent Documents

PTL 1: Japanese Unexamined Patent Application Publication No. 2019-048554

SUMMARY OF THE INVENTION

In the headlight such as shown in PTL 1, it is preferable to be able to adjust the direction in which the light is emitted, for example.

The present invention related to realizing adjustment in a plurality of devices in a ride with a simple configuration.

In a first aspect of the present invention, a ride having the following configuration is provided. That is, the ride includes a first device and a second device. The first device includes an adjustment mechanism. The second device includes an adjustment mechanism.

Any one of the first device and the second device is a lighting device in which a direction of a light source of light is adjustable. An opening is formed in the ride. The adjustment mechanism included in the first device and the adjustment mechanism included in the second device can be operated by being accessed from outside through the same opening.

This simplifies the configuration and prevents a reduction in mechanical strength compared to providing separate openings for each of the first device and the second device. In addition, the adjustment work of the first device and the second device can be easily performed together, for example, at the time of factory shipment of a ride.

In a second aspect of the present invention, the following adjustment method is provided. That is, the adjustment method targets a ride including a first device and a second device. The first device includes an adjustment mechanism. The second device includes an adjustment mechanism. Any one of the first device and the second device is a lighting device in which a direction of a light source of light is adjustable. An opening is formed in the ride. The adjustment mechanism included in the first device and the adjustment mechanism included in the second device are operated by being accessed from outside through the same opening.

This simplifies the configuration and prevents a reduction in mechanical strength compared to providing separate openings for each of the first device and the second device. In addition, the adjustment work of the first device and the second device can be easily performed together, for example, at the time of factory shipment of a ride.

According to the present invention, adjustment in a plurality of devices in a ride can be realized with a simple configuration.

DETAILED DESCRIPTION

An exemplary embodiment of the invention will be described with reference to the drawings. In the following description, the front, rear, left and right of a motorcycle 1 is defined based on the direction viewed from the driver riding in the motorcycle 1 (saddle vehicle, ride). The front-rear direction corresponds to the vehicle length direction (ride length direction), and the left-right direction corresponds to the vehicle width direction (ride width direction).

Figure 1:
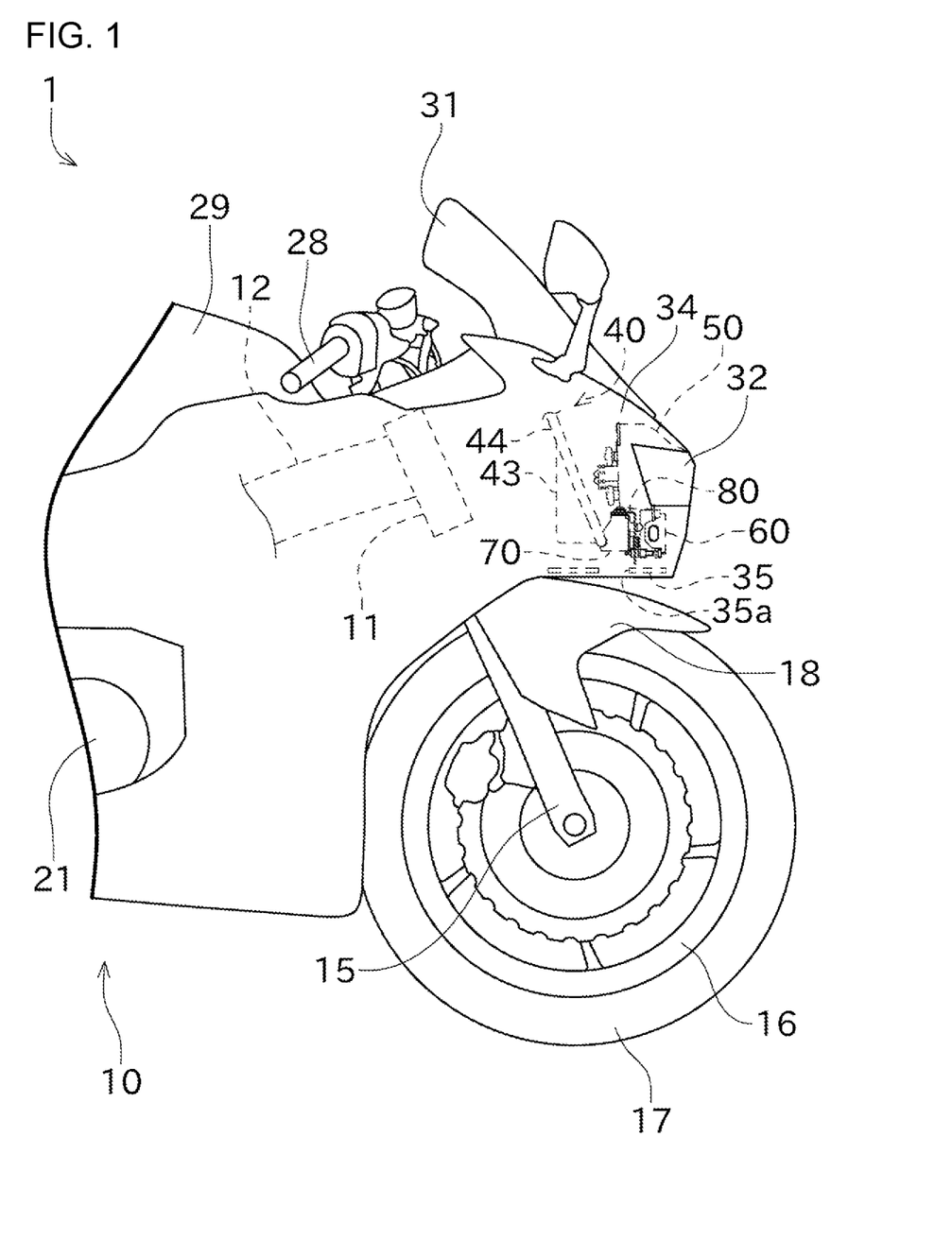
FIG. 1 is a side view showing a front part of a motorcycle.
Figure 2:
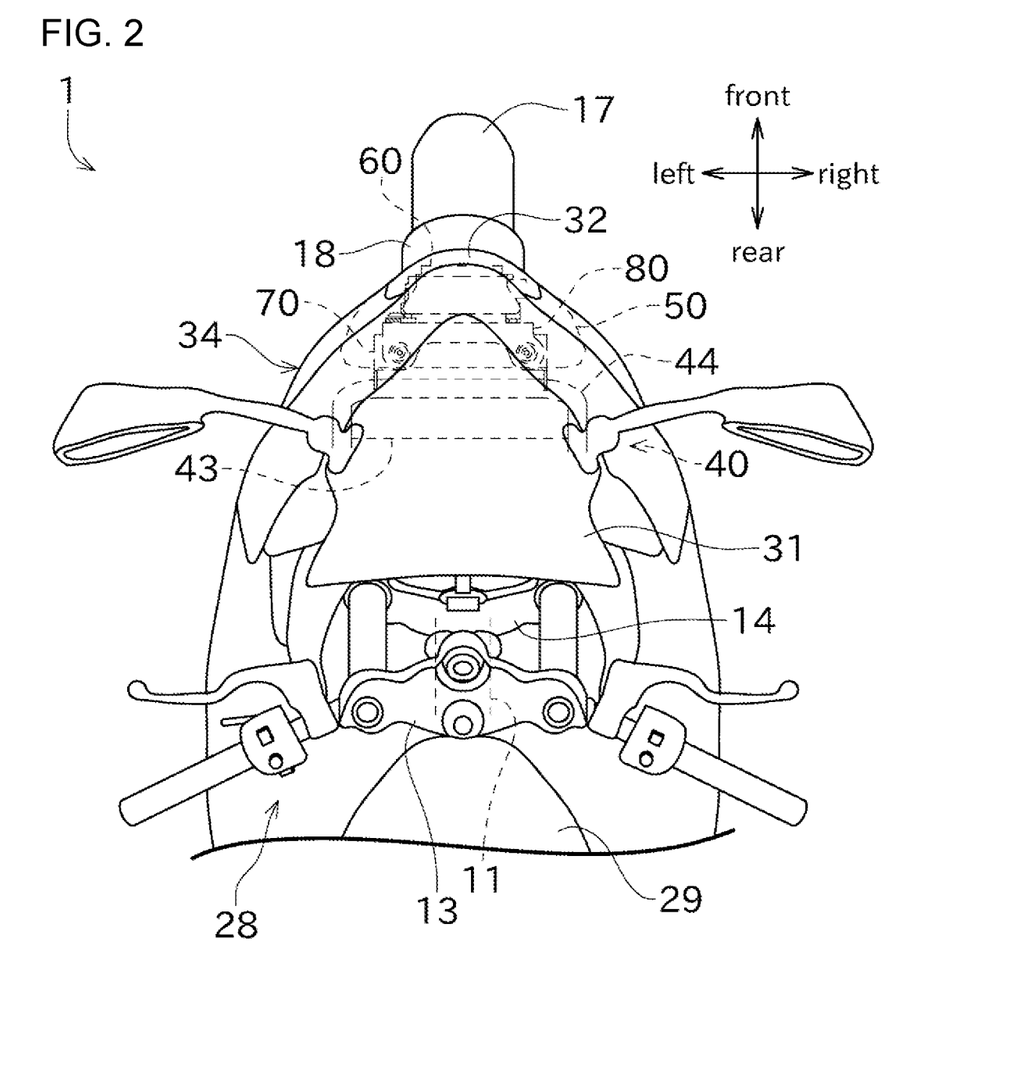
FIG. 2 is a plan view showing the front part of the motorcycle.

First, an overview of the motorcycle 1 according to this embodiment is described with reference to FIG. 1 and FIG. 2. FIG. 1 is a side view showing a front part of the motorcycle 1. FIG. 2 is a plan view showing the front part of the motorcycle 1.

As shown in FIG. 1, the motorcycle 1 has a vehicle body 10. This motorcycle 1 is, in other words, a two-wheeled vehicle. The vehicle body 10 includes a plurality of vehicle body frames that serve as the framework of the motorcycle 1. The motorcycle 1 has a head pipe 11 and a main frame 12 as the vehicle body frame. The configuration of the vehicle body frames is arbitrary and may be different from this embodiment.

A shaft insertion hole for inserting a steering shaft which is not shown is formed in the head pipe 11. As shown in FIG. 2, an upper bracket 13 is disposed above the head pipe 11. A lower bracket 14 is disposed below the head pipe 11. Fork insertion holes to which left and right front forks 15 shown in FIG. 1 are inserted are formed in the upper bracket 13 and lower bracket 14 respectively.

A front wheel 16 is rotatably mounted on the lower part of the front forks 15. A front tire 17 is fixed to the front wheel 16. Above the front tire 17 is covered by a front fender (fender) 18.

The main frame 12 is connected to the head pipe 11. The main frame 12 extends rearward from the head pipe 11. An engine 21 is supported on the main frame 12. A rear tire, which is not shown, is rotatably supported at the rear part of the main frame 12.

The power generated by the engine 21 is transmitted to the rear tire via the drive chain which is not shown. This allows the motorcycle 1 to travel. The engine 21 in this embodiment is a gasoline engine. Other drive sources, such as an electric motor, may be provided instead of or in addition to the gasoline engine.

A handlebar-type steering handle 28 is disposed near the upper ends of the front forks 15. When the driver turns the steering handle 28, the front forks 15 rotate, thus turning the motorcycle 1 to change the traveling direction. In addition, when the motorcycle 1 turns, the vehicle body 10 tilts toward the center of the turn relative to the road surface. Therefore, the motorcycle 1 is a type of leaning vehicle.

A fuel tank 29 in which fuel is stored is disposed behind the steering handle 28 and above the engine 21. A seat, not shown, for the driver to sit on is disposed behind the fuel tank 29. Steps, which are not shown, are disposed on the left and right sides of the vehicle body 10. The driver straddles the seat and places his/her feet on the left and right steps. Thus, the motorcycle 1 is a type of saddle vehicle.

A windscreen 31 is disposed in front of the steering handle 28. The windscreen 31 guides the driving wind so that it is less likely to hit the driver. To ensure the driver's visibility, the windscreen 31 is transparent or translucent and is capable of transmitting visible light.

A headlight 32 that illuminates the front is disposed at the front part of the vehicle body 10. The light source of the headlight 32 is arbitrary, and may be for example, light-emitting diode (LED), incandescent bulb, halogen bulb, or HID (High-Intensity Discharge) lamp.

The headlight 32 is a part of the headlight device (first device) 50. The headlight device 50 is composed of the aforementioned light source, as well as lens, reflector, etc., not shown in the figure, as a single unit. The headlight device 50 is a type of lighting device. As will be described later in detail, the headlight device 50 is configured to allow the direction of the light source of the headlight 32 to be adjusted.

One headlight 32 is disposed in the center of the vehicle width direction. However, a pair of left and right headlights may also be disposed, for example.

A radar device (second device) 60 is provided at the front part of the vehicle body 10. The radar device 60 is disposed below the headlight device 50.

The radar device 60 transmits electromagnetic waves (infrared waves, millimeter waves, or microwaves, etc.) in front of the motorcycle 1 and acquires the reflected waves (electromagnetic waves) reflected by objects. This enables detection of a direction in which the object exists and a distance to the object. The detection results of the radar device 60 are output to a computer (control unit, not shown) that controls the motorcycle 1. Based on the presence or absence of an object in front and the distance to the object, the computer notifies the driver of information about the object or automatically activates the brakes to assist in preventing a collision with the object.

A cowl is disposed on the outer surface of the motorcycle 1. The cowl is provided for the purpose of reducing the air resistance of the motorcycle 1, protecting each component of the motorcycle 1, and improving its appearance.

In this specification, the cowl located mainly in the front surface and front part of the motorcycle 1 is referred to as front cowl 34. The front part of the motorcycle 1 is the portion forward of the center of the motorcycle 1 in the vehicle length direction, for example, forward of the seat. The front cowl 34 is shaped to project forward. Therefore, a recess is formed behind the front cowl 34. The external shape of the front cowl 34 includes a portion that decreases in size in the vehicle width direction and in the vertical direction as they approach the front. Therefore, an interior space of the recess of the front cowl 34 also includes a portion that decreases in size in the vehicle width direction and in the vertical direction as they approach the front. The headlight 32 and the radar device 60 are disposed inside the front cowl 34.

The front of the radar device 60 is covered by the cowl, which is composed of a material that transmits electromagnetic waves of the frequencies used by radar and other devices. Therefore, the transmission and reception of the electromagnetic waves of the radar device 60 is not obstructed by the cowl.

A partition member 35 is disposed at approximately the lower end of the interior of the front cowl 34. The partition member 35 is formed in the shape of a plate and its thickness direction is directed vertically. The partition member 35 is provided to partition the space inside the front cowl 34 and a space where the front fender 18 is disposed.

Figure 3:
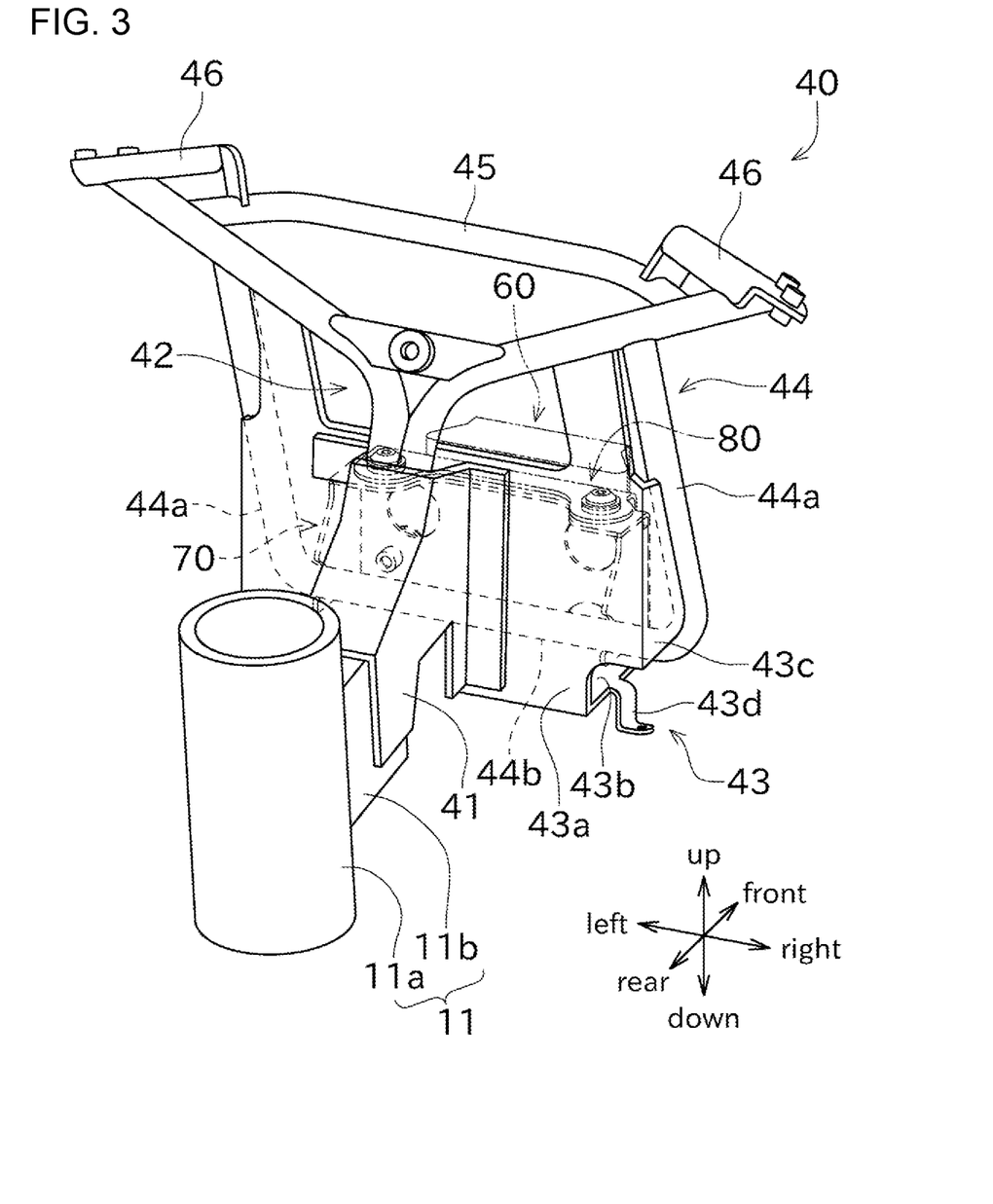
FIG. 3 is a diagonal view from the rear showing a support frame.
Figure 4:
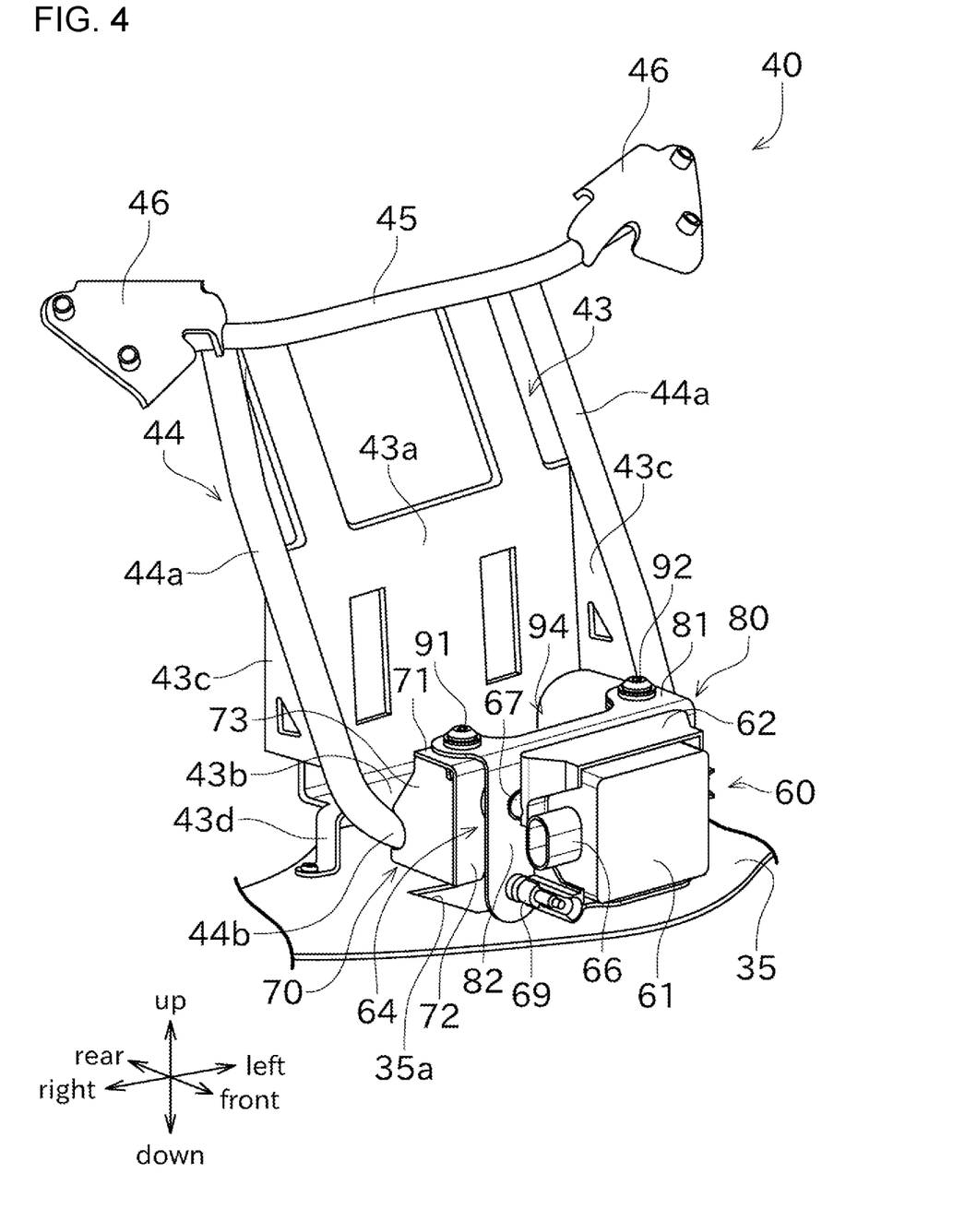
FIG. 4 is a diagonal view from the front showing a radar stay and a radar device.

Next, the frame structure for supporting the radar device 60 will be described. FIG. 3 is a diagonal view from the rear showing a support frame 40. FIG. 4 is a diagonal view from the front showing a radar stay 70 and the radar device 60.

As shown in FIG. 3, the head pipe 11 includes a tubular portion 11a where the shaft insertion hole is formed, and a mounting base 11b extending forward from the tubular portion 11a. The tubular portion 11a and the mounting base 11b are connected, for example, by welding.

A support frame (frame) 40 is attached to the mounting base 11b. The support frame 40 is connected to the head pipe 11 and is located forward of the head pipe 11. The support frame 40 is a frame for supporting a plurality of electrical components including the headlight device 50 and the radar device 60.

The support frame 40 includes a connection frame 41, a branch frame 42, a plate frame 43, a hanging frame 44, and a front frame 45.

The connection frame 41 is located at the connection with the mounting base 11b. The connection frame 41 is configured to allow insertion of the mounting base 11b. The connection frame 41 and the mounting base 11b are connected using fixing members such as bolts and nuts which are not shown, for example. The connection frame 41 and the mounting base 11b may be connected by welding.

The branch frame 42 is fixed to the connection frame 41. The branch frame 42 includes two pipe-shaped members fixed to each other. The branch frame 42 extends diagonally forward and upward from the fixed point with the connection frame 41 and further branches in the left-right direction forming a Y-shape.

The plate frame 43 is L-shaped in the side view. As shown in FIG. 4, the plate frame 43 is disposed above the partition member 35. The partition member 35 is omitted in FIG. 3, and the plate frame 43 is omitted in FIG. 5 and thereafter. The plate frame 43 includes a first plate 43a and a second plate 43b. The L-shape is composed of the first plate 43a and the second plate 43b.

The first plate 43a is arranged so that its thickness direction is generally in the front-rear direction. The rear side of the first plate 43a is fixed to the connection frame 41 shown in FIG. 3. Upper ends of the first plate 43a are fixed to the left and right branch portions of the branch frame 42, respectively.

One or more electrical components are disposed in the space in front of the first plate 43a, respectively. The electrical components are, for example, the headlight device 50, an engine control unit, and a relay box. In FIG. 3 and FIG. 4, the headlight device 50 is omitted for the sake of drawing simplicity. A plurality of stays that are not shown for mounting electrical and other electrical components are fixed to the front side of the first plate 43a.

The second plate 43b is arranged so that its thickness direction is generally vertical. The lower end of the first plate 43a and the rear end of the second plate 43b are connected at an approximately vertical angle.

The front end of the second plate 43b is connected to a mounting portion 44b described later which is included in the hanging frame 44. Legs 43d are integrally formed at both ends of the second plate 43b in the vehicle width direction. The legs 43d extend downward from the second plate 43b and are fixed to the partition member 35.

A third plate 43c is disposed at each of the both ends of the plate frame 43 in the vehicle width direction. Each of the third plates 43c is arranged so that their thickness direction is generally in the left-right direction. The third plate 43c is formed in a right-angled triangular shape. The rear end of the third plate 43c is connected to the first plate 43a at an approximately vertical angle.

The front end of the third plate 43c is connected to an extending portion 44a described later which is included in the hanging frame 44.

The hanging frame 44 is disposed above the partition member 35, as shown in FIG. 4. The hanging frame 44 has an elongated pipe-shaped member bent into a substantially U-shape. The hanging frame 44 has a pair of left and right extending portions 44a, and one mounting portion 44b. The U-shape is composed of the extending portions 44a and the mounting portion 44b.

The extending portion 44a extends in a straight diagonal line that is forward-descending in the side view. The upper end of each of the extending portions 44a is fixed to each of the branch portions of the branch frame 42.

The mounting portion 44b extends in a straight line in the vehicle width direction. The mounting portion 44b connects the lower ends of the extending portions 44a.

In this embodiment, the hanging frame 44 is constructed by bending a single pipe, but the hanging frame 44 may be made by connecting a plurality of members by welding, fixing member, or the like.

The front frame 45 is elongated to extend in the vehicle width direction. The front frame 45 connects the left and right branch portions of the branch frame 42.

The support frame 40 has mirror stays 46 and a radar stay (stay) 70.

The mirror stays 46 are members for mounting the left and right side mirrors. Each of the mirror stays 46 is connected to both the branch frame 42 and the front frame 45.

The radar stay 70 is a member for mounting the radar device 60 and is connected to the mounting portion 44b of the hanging frame 44. The radar stay 70 will be described later in detail.

In addition to the above, stays and other components may be provided to the hanging frame 44 for attaching other electrical component or the like.

Next, the radar stay 70 will be described in detail. The radar stay 70 is fixed to the hanging frame 44. By the radar stay 70, the support frame 40 can support the radar device 60 via a radar bracket 80 described later.

Figure 5:
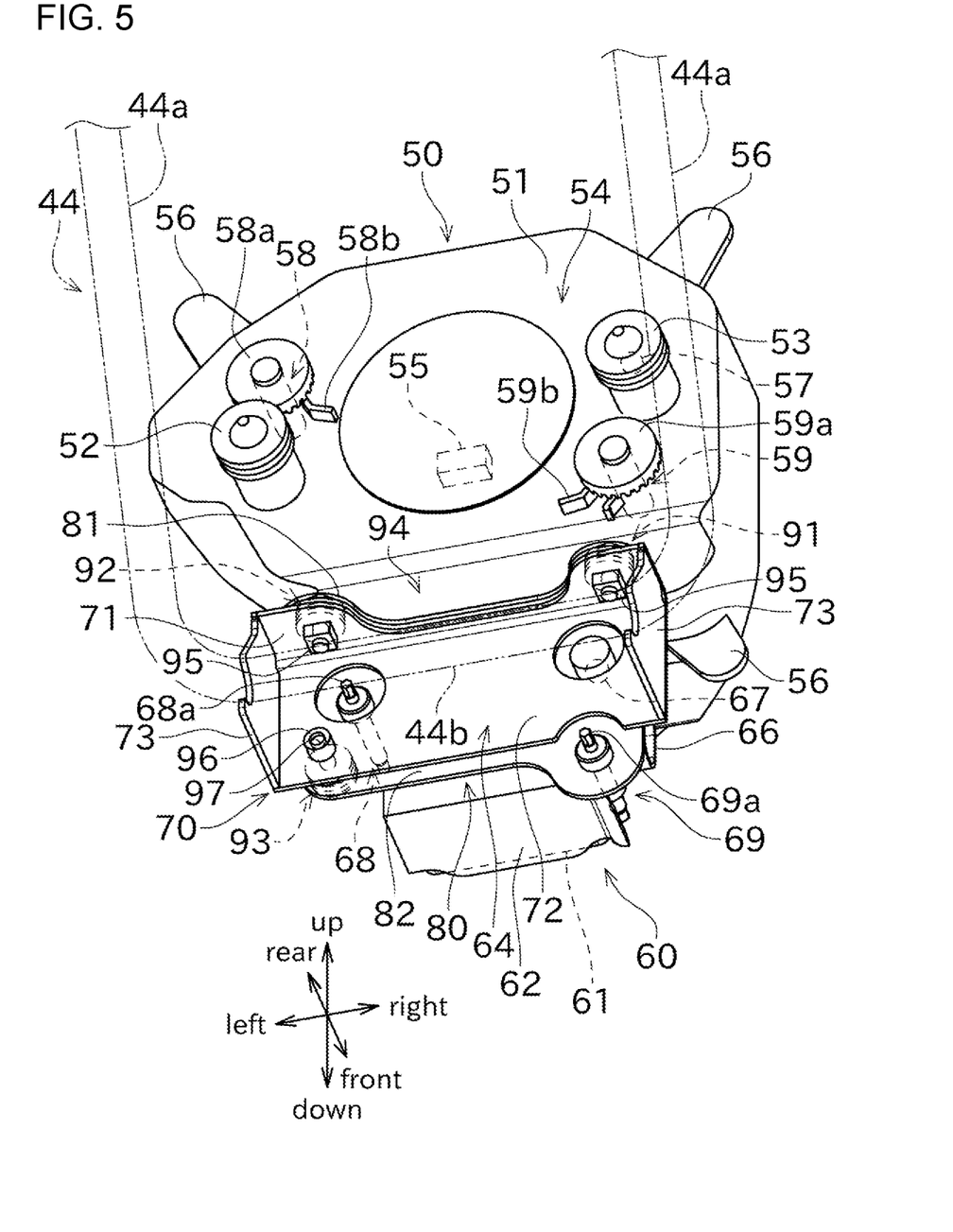
FIG. 5 is a diagonal view from the rear bottom showing an orientation adjustment mechanism of a headlight device and an orientation adjustment mechanism of the radar device.

The radar stay 70, as shown in FIG. 4 and FIG. 5, includes a first mounting portion 71, a second mounting portion 72, and a side plate portion 73.

The first mounting portion 71 is a plate-shaped member and is arranged so that its thickness direction is directed vertically. The first mounting portion 71 is disposed at a position that is higher than the mounting portion 44b of the hanging frame 44.

A pair of left and right attaching holes which are not shown for being inserted by screws 91, 92 to attach the radar bracket 80 are formed in the first mounting portion 71. The axis of each attaching hole is directed perpendicular to the first mounting portion 71, i.e., vertically. As shown in FIG. 5, nuts 95 are fixed to a lower surface of the first mounting portion 71. As a result of this, female screw portions for fixing the screws 91, 92 are formed.

The second mounting portion 72 is a plate-shaped member and is arranged so that its thickness direction is directed along the front-rear direction. The first mounting portion 71 is located forward of the mounting portion 44b of the hanging frame 44. The second mounting portion 72 is connected to the front end of the first mounting portion 71 at an approximately vertical angle.

As shown in FIG. 5, an attaching hole 97 for being inserted by a screw 93 to attach the radar bracket 80 is formed at an appropriate position of the second mounting portion 72. This attaching hole 97 is formed as an axial hole for a boss portion 96 which has a cylindrical shape fixed to the second mounting portion 72. The attaching hole 97 is directed perpendicular to the second mounting portion 72, i.e., in the front-rear direction. The boss portion 96 is disposed so that it protrudes rearward than the second mounting portion 72. The attaching hole 97 is formed with a female screw portion for fixing the screw 93.

The side plate portions 73 are arranged in pairs at both ends of the radar stay 70 in the vehicle width direction. Each of the side plate portions 73 is arranged so that its thickness direction is approximately along the vehicle width direction. The rear ends of the side plate portions 73 are fixed to the front surface of the mounting portion 44b by welding or other appropriate methods. The side plate portions 73 are provided to protrude forwardly than the mounting portion 44b. This makes it easier to locate the radar device 60 forward so that the detection range of the radar device 60 is less likely to be blocked by other members. The upper end of the side plate portion 73 is fixed to the first mounting portion 71, and the front end of the side plate portion 73 is fixed to the second mounting portion 72.

The lower side of the radar stay 70 is open. In the partition member 35, at a position facing the radar stay 70 in the vertical direction, an insertion opening (opening) 35a is formed in a through shape. The insertion opening 35a will be described later in detail.

Next, the radar bracket 80 is described in detail.

The radar bracket 80 is configured as an L-shaped plate-like member, as shown in FIG. 4 and the like. The radar bracket 80 includes a first mounting portion 81, and a second mounting portion 82.

The first mounting portion 81 is a plate-shaped portion and is arranged so that its thickness direction is directed vertically. The first mounting portion 81 is disposed above the radar stay 70. The first mounting portion 81 is fixed to the first mounting portion 71 included in the radar stay 70 by the screws 91, 92.

The second mounting portion 82 is a plate-shaped portion and is arranged so that its thickness direction is directed along the front-rear direction. The second mounting portion 82 is disposed in front of the radar stay 70. The second mounting portion 82 is fixed to the second mounting portion 72 included in the radar stay 70 by the screw 93 shown in FIG. 5. The radar device 60 is mounted on the front side of the second mounting portion 82.

The three screws 91, 92, 93 are each fitted with a grommet as an anti-vibration member. Thus, the radar device 60 can be anti-vibration supported. The screws 91, 92 are mounted in the vertical direction, and the screw 93 is mounted in the front-rear direction. Thus, the combination of grommets arranged in a perpendicular direction to each other can suppress vibration in various directions transmitted to the radar device 60.

The radar stay 70 can be considered the base portion of the radar device 60. In this embodiment, the radar stay 70, as this base portion, is fixed to the support frame 40.

Therefore, compared to the configuration in which the radar device 60 is fixed to the support frame 40 via the headlight 32 for example, or is fixed to the support frame 40 via another frame, the accumulated error with respect to the reference position of the frame can be suppressed. This allows for good mounting accuracy of the radar device 60.

Next, the configuration of the radar device 60 will be described in detail. As shown in FIG. 4 and the like, the radar device 60 includes a main body 61, a holding case 62, and an orientation adjustment mechanism (adjustment mechanism) 64.

The main body 61 has a housing that is generally rectangular in shape. An antenna and circuitry for transmitting and receiving electromagnetic waves are built in the housing. This configuration allows electromagnetic waves to be transmitted and received from the front surface of the main body 61.

A connector 66 is provided on one side of the main body 61 in the vehicle width direction. Although not shown, a power supply line to the main body 61, and a signal line to output the detection results of the main body 61 to the computer described above are connected to the connector 66.

The holding case 62 is box-shaped with an open front. The main body 61 is fixed to the holding case 62 in an appropriate manner by inserting a portion of the rear side into the interior space of the holding case 62. The method of fixing the main body 61 to the holding case 62 may include, but is not limited to, the use of a fixing member such as a screw, for example. An opening is formed in the front end of the holding case 62, through which the front surface of the main body 61 is exposed.

The orientation adjustment mechanism 64 is disposed between the holding case 62 and the radar bracket 80. The orientation adjustment mechanism 64 can adjust the direction of the radar device 60 (for example, a first rotation angle around a first axis in the vertical direction, and a second rotation angle around a second axis in the left-right direction).

As shown in FIG. 5, the orientation adjustment mechanism 64 has a pivot point part 67, a first adjustment part 68, and a second adjustment part 69.

The pivot point part 67 is configured as a spherical bearing, for example. The direction of the holding case 62 with respect to the radar bracket 80 can be changed three-dimensionally around this pivot point part 67.

Each of the first adjustment part 68 and the second adjustment part 69 is configured, for example, as a screw mechanism. The first adjustment part 68 and the second adjustment part 69 include adjustment members 68a, 69a which rotate integrally with screw shafts, respectively.

The first adjustment part 68 is arranged in line with the pivot point part 67 in the vehicle width direction. The screw shaft of the first adjustment part 68 is directed in the front-rear direction as shown in FIG. 5, and is rotatably supported by the second mounting portion 82 of the radar bracket 80. A front portion of the screw shaft is screw-coupled to the holding case 62. The rear portion of the screw shaft passes through a through hole in the second mounting portion 72 of the radar stay 70 and projects rearward. The adjustment member 68a is provided at the rear end of this screw shaft. By rotating the adjustment member 68a, the holding case 62 can be screw fed. As a result, the first rotation angle of the radar device 60 can be adjusted.

The second adjustment part 69 is arranged in line with the pivot point part 67 in the vertical direction. The screw shaft of the second adjustment part 69 is directed in the same front-rear direction as the first adjustment part 68, and is rotatably supported by the second mounting portion 82 of the radar bracket 80. A front portion of the screw shaft is screw-coupled to the holding case 62. The rear portion of the screw shaft passes below the second mounting portion 72 of the radar stay 70 and projects rearward. The adjustment member 69a is provided at the rear end of this screw shaft. By rotating the adjustment member 69a, the holding case 62 can be screw fed. As a result, the second rotation angle of the radar device 60 can be adjusted.

The two adjustment members 68a, 69a are located rearward of the main body 61. Therefore, the operator operates the adjustment members 68a, 69a from the rear of the radar device 60. Each of the adjustment members 68a, 69a corresponds to a second operation member.

As shown in FIG. 1 and FIG. 2, the radar device 60 of this embodiment is located in the center of the vehicle width direction. The radar device 60 is disposed so that it overlaps the headlight device 50 in plan view and is located below the headlight device 50.

The front cowl 34 of this embodiment is shaped to decrease in size in the vehicle width direction as it approaches the front end. This may make it difficult to line up both the radar device 60 and the headlight 32, which are preferred to be located at the front end, in the vehicle width direction. In this regard, by lining up the radar device 60 and the headlight 32 vertically as in this embodiment, both can be located at the front end of the front cowl 34.

Although the detection range of the radar system 60 varies depending on the content and performance of the control or the like, since the radar device 60 basically detects obstacles on the road (that is, it does not need to detect obstacles in the sky), the detection range in the left-right direction may be wider than the detection range in the up-down direction. In this case, assuming that the radar device 60 and the headlight 32 are arranged side by side in the vehicle width direction, if the headlight 32 is slightly further forward than the radar device 60, there is a possibility that the detection range of the radar device 60 is interfered by the headlight 32. In this regard, by lining up the radar device 60 and the headlight 32 in the vertical direction, a wide range of detection in the left-right direction by the radar device 60 can be realized.

Next, the relationship between the radar device 60, the radar stay 70, and the radar bracket 80 will be described. As mentioned above, the radar bracket 80 is attached to the radar stay 70, and the radar device 60 is attached to this radar bracket 80.

As shown in FIG. 4, the radar device 60, the radar stay 70 and the radar bracket 80 are all located above the partition member 35. In the situation where the radar device 60 is attached to the radar stay 70 using the radar bracket 80, the radar bracket 80 and the radar device 60 do not contact with the partition member 35. Therefore, it is easier to secure a space to allow the direction of the radar device 60 to be adjusted so that the front is lower.

The members that attach the radar bracket 80 to the radar stay 70 include the screws 91, 92. Between a pair of left and right screws 91, 92, a recess 94 with an open rear is formed in each of the first mounting portion 81 of the radar bracket 80 and the first mounting portion 71 of the radar stay 70.

Each of the recesses 94 is located to connect between the interior space of the radar stay 70 and the space above the radar stay 70. The interior space of the radar stay 70 can be paraphrased as the space behind the radar device 60. The space above the radar stay 70 can be paraphrased as the space behind the headlight device 50.

Next, the headlight device 50 with headlight 32 will be described.

The headlight device 50 shown in FIG. 5 includes a housing 51 formed in the shape of a block. On the rear surface of the housing 51, a pair of left and right grommets 52, 53 are disposed side by side. The grommets 52, 53 are fixed to an appropriate member on the side of the support frame 40. A result of this, the headlight device 50 is fixed to the vehicle body 10. To attach the grommets 52, 53, cylindrical mounting bosses are formed on the housing 51 to project rearward.

A plurality of fixing convolutions 56 are integrally formed on the housing 51. The fixing convolutions 56 are fixed to appropriate positions of the front cowl 34, for example.

The headlight device 50 has an orientation adjustment mechanism (adjustment mechanism) 54. The orientation adjustment mechanism 54 can adjust the direction of the light source 55 of the headlight 32 (for example, a first rotation angle around a first axis in the vertical direction, and a second rotation angle around a second axis in the left-right direction).

The configuration of the orientation adjustment mechanism 54 is substantially the same as that of the orientation adjustment mechanism 64 of the radar device 60, so it will be briefly described. As shown in FIG. 5, the orientation adjustment mechanism 54 includes a pivot point part 57, a first adjustment part 58, and a second adjustment part 59.

The pivot point part 57 is configured as a spherical bearing, for example. An angle adjustment plate (not shown) is supported inside the housing 51. The direction of the angle adjustment plate can be changed three-dimensionally around the pivot point part 57. The light source 55 is fixed to the angle adjustment plate. By changing the orientation of the angle adjustment plate, the direction of the light source 55 can be changed.

The first adjustment part 58 and second adjustment part 59 are configured as screw mechanisms. The first adjustment part 58 is arranged in line with the pivot point part 57 in the vehicle width direction. The second adjustment part 59 is arranged in line with the pivot point part 57 in the vertical direction.

The first adjustment part 58 has a first adjustment member 58*a* that rotates integrally with the screw shaft. The second adjustment part 59 has a second adjustment member 59*a* that rotates integrally with the screw shaft. Each of the screw shafts of the first adjustment part 58 and the second adjustment part 59 is directed along the front-rear direction, and is rotatably supported by the housing. The front portion of each screw shaft is screw-coupled to the angle adjustment plate.

The screw shaft of the first adjustment part 58 and the screw shaft of the second adjustment part 59 project rearward from the housing 51. A first adjustment member 58*a* is fixed to the rear end of the screw shaft of the first adjustment part 58. A second adjustment member 59*a* is fixed to the rear end of the screw shaft of the second adjustment part 59.

Each of the first adjustment member 58*a* and the second adjustment member 59*a* is configured as a gear. The second adjustment member 59*a* is located on the opposite side of the first adjustment member 58*a* across a centerline in the width direction of the headlight device 50 (it can be rephrased as a centerline in the vehicle width direction of the motorcycle 1).

The screw shaft can be rotated by engaging a tool with teeth formed on its tip with the first adjustment member 58*a*. As a result, the first rotation angle of the angle adjustment plate can be changed. Similarly, the screw shaft can be rotated by rotating the second adjustment member 59*a* with the teeth of the tool engaged. As a result, the second rotation angle of the angle adjustment plate can be changed.

The first adjustment member 58*a* and the second adjustment member 59*a* are located rearward the housing 51. Therefore, the operator operates the first adjustment member 58*a* and the second adjustment member 59*a* from the rear of the headlight device 50. Each of the first adjustment member 58*a* and the second adjustment member 59*a* corresponds to a first operation member.

Next, the orientation adjustment of the radar device 60 and the light source 55 will be described.

As shown in FIG. 4, the insertion opening 35*a* is formed at the partition member 35. This insertion opening 35*a* is used to operate the orientation adjustment mechanism 54 included in the headlight device 50 and to operate the orientation adjustment mechanism 64 included in the radar device 60.

As shown in FIG. 1 and the like, the insertion opening 35*a* is located lower than the radar device 60 and lower than the headlight device 50. On the other hand, the insertion opening 35*a* is located higher than the front fender 18.

The insertion opening 35*a* is formed at a position between the front fender 18 and the radar stay 70. The insertion opening 35*a* faces both the radar stay 70 and the front fender 18 in the vertical direction.

The headlight device 50 is located higher than the radar device 60. Therefore, starting from the insertion opening 35*a*, the headlight device 50 is farther away than the radar device 60.

Figure 6:
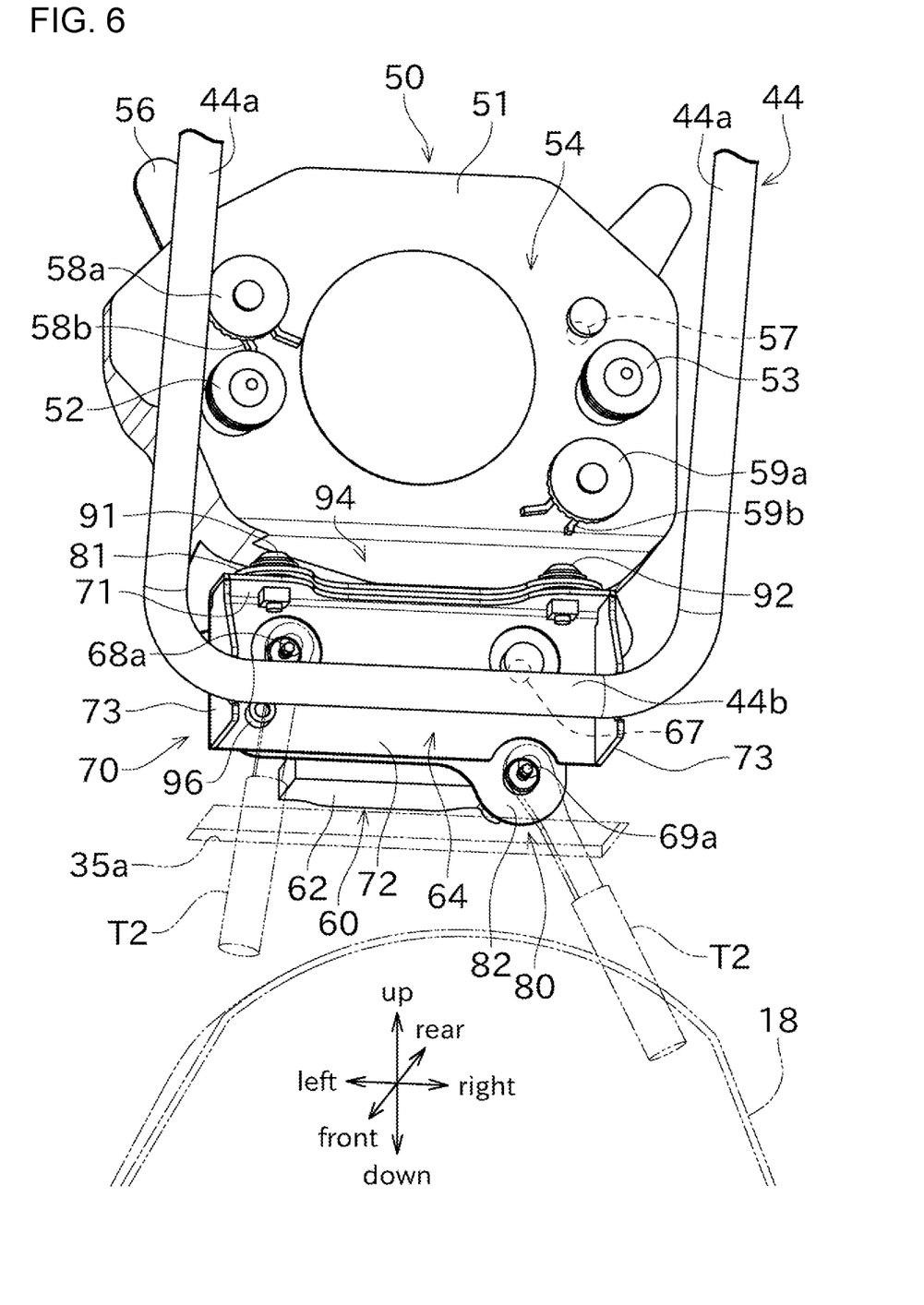
FIG. 6 is a diagonal view illustrating operation of the orientation adjustment mechanism of the radar device.

FIG. 6 shows the operation of the orientation adjustment mechanism 64 of the radar device 60. In FIG. 6 and after, the partition member 35 is omitted for ease of viewing the drawing, and only the insertion opening 35*a* is shown transparently with a chain line.

As shown in FIG. 6, by inserting the tool T2 from bottom to top through the insertion opening 35*a*, the space behind the second mounting portion 72 of the radar bracket 80 or the space behind the second mounting portion 82 of the radar bracket 80 can be accessed. As a result, the adjustment member 68*a* and the adjustment member 69*a* can be rotated as needed. This allows the orientation adjustment mechanism 64 to be operated to change the direction of the radar device 60.

Figure 7:
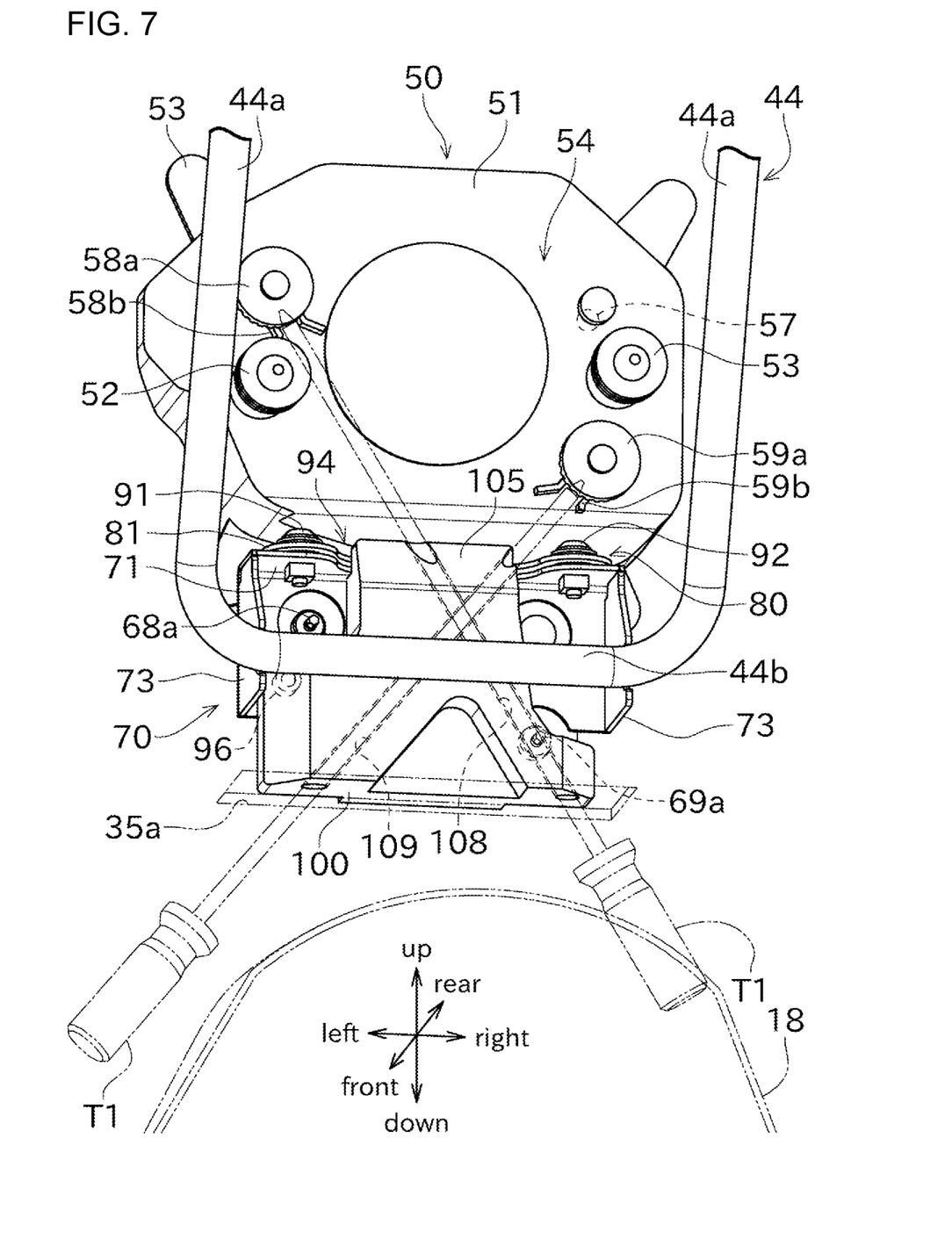
FIG. 7 is a diagonal view illustrating operation of the orientation adjustment mechanism of the headlight device.

As shown in FIG. 7, by inserting the tool T1 from bottom to top through the same insertion opening 35*a* as above, the space behind the headlight device 50 can be accessed. As a result, the first adjustment member 58*a* and the second adjustment member 59*a* can be rotated as needed. This allows the orientation adjustment mechanism 54 to be operated to change the direction of the light source 55 of the headlight device 50.

Thus, by accessing from the outside via the common insertion opening 35*a*, orientation adjustments can be made with respect to the headlight device 50 and the radar device 60. Since the insertion opening 35*a* is common to both the headlight device 50 and the radar device 60, compared to forming individual openings corresponding to the headlight device 50 and the radar device 60, the configuration can be simplified and the mechanical strength of the partition member 35 can be prevented from reduction.

The insertion opening 35*a* is for orientation adjustment as described above. In addition to this, the insertion opening 35*a* also serves to improve the heat dissipation of internal components in the front cowl 34, such as the headlight device 50 and the radar device 60.

The tool T1 to operate the orientation adjustment mechanism 54 of the headlight device 50 needs to be able to insert for a longer distance from the insertion opening 35a than the tool T2 to operate the orientation adjustment mechanism 64 of the radar device 60. If such a long tool T1 is attempted to be inserted perpendicular to the horizontal plane, the tool T1 will interfere with the front fender 18 which is located near below the insertion opening 35a. It is possible to form a larger insertion opening 35a, but this is often difficult from the aspect of securing space and the mechanical strength of the partition member 35.

Moreover, the first mounting portion 71 of the radar stay 70, the first mounting portion 81 of the radar bracket 80, the screws 91, 92, mounting bosses for the grommets 52, and the like are located near below the adjustment member 58a and the adjustment member 59a of the headlight device 50. If the tool T1 were to be inserted vertically, the components above would interfere with the tool T1.

In other words, the middle portion in the vertical direction of the space where the tool T1 can be inserted, is narrower in the vehicle width direction, as if it is necked. This necked portion is, for example, the portion corresponding to the recess 94 described above between the screws 91, 92.

Therefore, in this embodiment, the tool T1 shown in FIG. 7 is inserted diagonally through the insertion opening 35a to operate the orientation adjustment mechanism 54. That is, for operating the adjustment member 58a located on the left side of the headlight device 50, the operator inserts the tool T1 from the right side of the front fender 18 diagonally upward to the left. For operating the adjustment member 59a located on the right side of the headlight device 50, the operator inserts the tool T1 from the left side of the front fender 18 diagonally upward to the right.

By inserting the tool T1 diagonally upward to the left, the tip of the tool T1 can pass through the recess 94 between the screws 91, 92, and then through the side of the grommet 52 to reach the first adjustment member 58a. By inserting the tool T1 diagonally upward to the right, the tip of the tool T1 can pass through the recess 94 between the screws 91, 92 to reach the second adjustment member 59a.

The top surface of the front fender 18 is curved so that the center of the vehicle width direction is convex upward. Therefore, the space between the partition member 35 and the front fender 18 is wide open on both sides in the vehicle width direction. Therefore, it is easy to insert the tool T1 diagonally upward from both the left and right sides so that it passes through the insertion opening 35a above the front fender 18.

In this embodiment, the headlight device 50 is configured as a single-light type. In recent years, the headlight device 50 has become smaller, and as a result, the first adjustment member 58a and the second adjustment member 59a are often disposed near the center of the vehicle width direction. In this regard, in this embodiment, access to the first adjustment member 58a and the second adjustment member 59a is performed by inserting the tool T1 from the opposite side of the left and right. Therefore, the inclination angle of the tool T1 is large, thus preventing interference between the front fender 18 and the tool T1.

Figure 8:
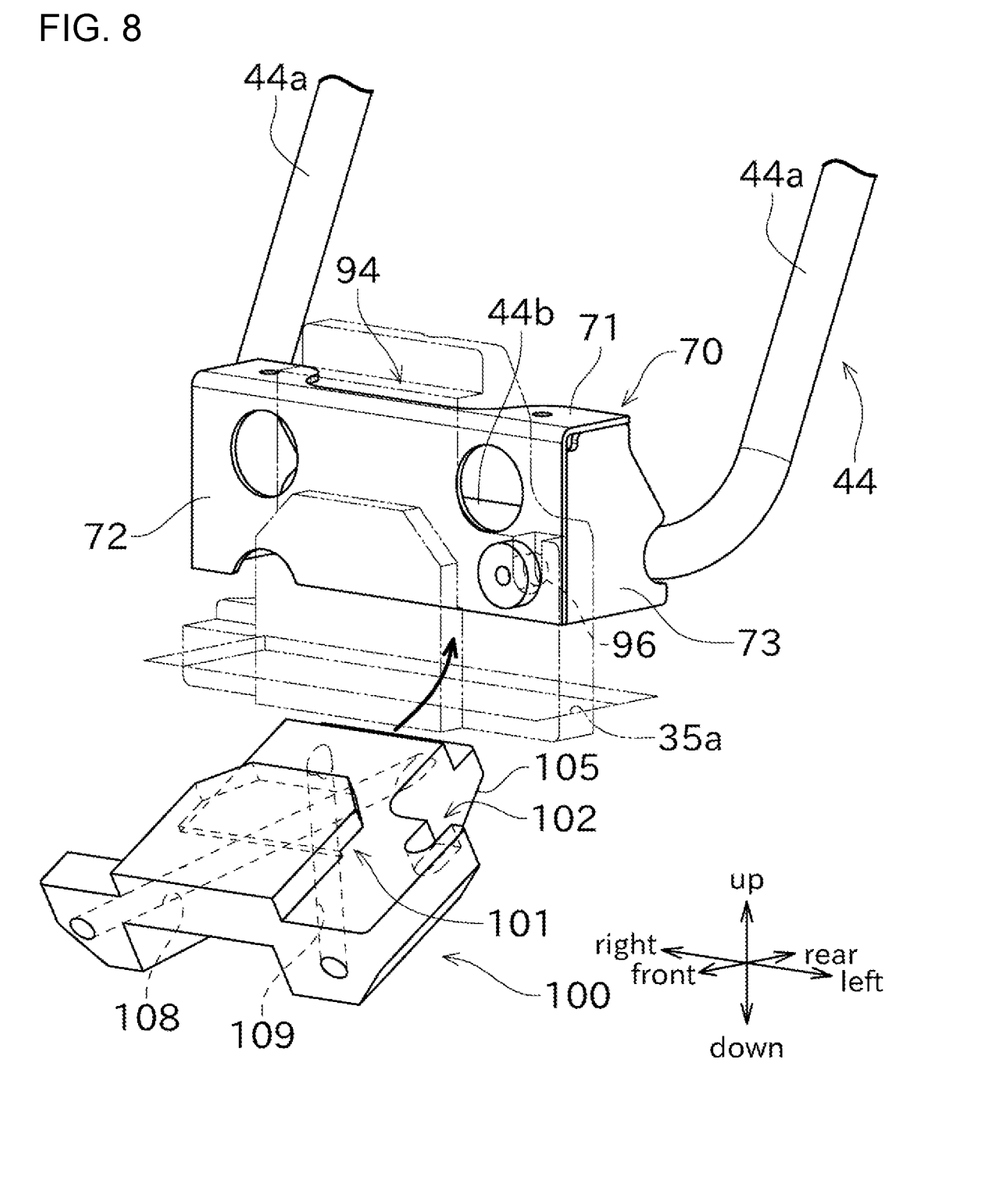
FIG. 8 is a diagonal view from the front illustrating the operation of attaching the jig to the motorcycle.

In this embodiment, in order to guide the tool T1 diagonally to facilitate operation of the orientation adjustment mechanism 54, a jig 100 that can be attached and detached to the vehicle body 10 is used. The jig 100 will be described with reference to FIG. 8. FIG. 8 is a diagonal view from the front illustrating the operation of attaching the jig 100 to the motorcycle 1. In FIG. 8, the headlight device 50, the radar device 60, the radar bracket 80, and the like are omitted.

The jig 100 is configured as a block-shaped member, for example, by synthetic resin. The jig 100 is shaped so that it can be inserted into the insertion opening 35a from below.

A first recess 101 is formed in a front portion of the jig 100. This first recess 101 is formed in the shape of an elongated slit in the vehicle width direction, which is open at the top. The lower end of the second mounting portion 72 included in the radar stay 70 can be inserted to the first recess 101.

The thickness of the first recess 101 is substantially equal to the thickness of the second mounting portion 72. Therefore, the jig 100 can be positioned in the front-rear direction with respect to the radar stay 70 by inserting the second mounting portion 72 into the first recess 101 as shown by the chain line in FIG. 8. In addition, the jig 100 can be positioned vertically with respect to the radar stay 70 by a bottom of the first recess 101 contacting a lower end surface of the second mounting portion 72.

A second recess 102 is formed in the front portion of the jig 100. This second recess 102 is formed in a U-shape with openings above and in front. A rear end of the boss portion 96 included in the radar stay 70 can be inserted into the second recess 102.

The dimension of the second recess 102 in the vehicle width direction is substantially equal to the dimension of the boss portion 96 in the vehicle width direction. Therefore, the jig 100 can be positioned in the vehicle width direction with respect to the radar stay 70 by inserting the boss portion 96 into the second recess 102.

The second mounting portion 72 and the boss portion 96 constitute a positioning mechanism positioning the jig 100 which has the first recess 101 and the second recess 102 at a predetermined position.

This positioning action allows the jig 100 to be attached to the radar stay 70 at an exact position. Thus, the tool T1 can be guided to the exact position as shown in FIG. 7.

The jig 100 has two guide holes 108, 109 which are formed to penetrate diagonally. The two guide holes 108, 109 intersect in an X-shape. The shaft of the tool T1 can be inserted into each of the guide holes 108, 109.

In the orientation adjustment mechanism 54 of the headlight device 50, the first adjustment member 58a and the second adjustment member 59a is disposed left-right asymmetrically. Correspondingly, the two guide holes 108, 109 formed in the jig 100 are also arranged left-right asymmetrically, specifically, the inclination angles of the guide holes 108, 109 are different from each other.

An appropriately shaped recess is formed at each of the upper portions of the left and right sides of the jig 100. As a result, the jig 100 has an inverted T-shape in the rear view when mounted on the radar stay 70. The jig 100 can be prevented from interfering with the adjustment members 68a, 69a with respect to the orientation adjustment mechanism 64 of the radar device 60, by these recesses.

In the orientation adjustment mechanism 64 of the radar device 60, the two adjustment members 68a, 69a are located in left-right asymmetrical positions. Correspondingly, the recesses formed in the jig 100 to prevent interference are also left-right asymmetrical.

An inclined portion 105 is formed at the rear upper edge of the jig 100. As a result, the upper end of the jig 100 is shaped so that its dimension in the front-rear direction decreases as it moves upward. In this embodiment, the gap in the height direction between the partition member 35 and the front fender 18 is small. Therefore, to attach the jig 100 to the radar stay 70, it is necessary that the jig 100 is inserted between the partition member 35 and the front fender 18 in a collapsed posture as shown in FIG. 8, and then, as shown by the thick arrow, the jig 100 is inserted into the insertion opening 35a while simultaneously raising its posture. In this respect, since the jig 100 has the inclined portion 105, the posture change of the jig 100 as described above can be easily performed. Therefore, it is easy to work with.

In the headlight device 50 shown in FIG. 7, guides 58b, 59b are provided in the vicinity of the first adjustment member 58a and the second adjustment member 59a, respectively. These guides 58b, 59b are configured as ribs protruding rearward from the housing 51. The guides 58b, 59b are integrally formed in the housing 51. By the guide holes 108, 109 of the jig 100 and the guides 58b, 59b of the headlight device 50, the tip of the tool T1 can be diagonally guided to the first adjustment member 58a or the second adjustment member 59a accurately.

As described above, the motorcycle 1 includes the headlight device 50 and the radar device 60. The headlight device 50 includes the orientation adjustment mechanism 54. The radar device 60 includes the orientation adjustment mechanism 64. The headlight device 50 is capable of adjusting the direction of the light source 55 of the light. The insertion opening 35a is formed in the motorcycle 1. The orientation adjustment mechanism 54 included in the headlight device 50 and the orientation adjustment mechanism 64 included in the radar device 60 can be operated by being accessed from outside through the same insertion opening 35a.

This simplifies the configuration and prevents a reduction in mechanical strength compared to providing separate openings for each of the headlight device 50 and the radar device 60. In addition, the orientation adjustment work of the headlight device 50 and the radar device 60 can be easily performed together, for example, at the time of factory shipment of the motorcycle 1.

The motorcycle 1 of this embodiment includes the guides 58b, 59b that guide the tool T1 inserted into the insertion opening 35a to the orientation adjustment mechanism 54 included in the headlight device 50.

This provides good workability.

In the motorcycle 1 of this embodiment, the headlight device 50 and the radar device 60 are lined up in the vertical direction. The insertion opening 35a is disposed lower than the headlight device 50 and lower than the radar device 60. The insertion opening 35a is open downward.

Thus, the direction of the headlight device 50 and the direction of the radar device can be adjusted by access from below via the insertion opening 35a, which is not easily visible from outside.

The motorcycle 1 of this embodiment includes the support frame 40. The headlight device 50 is located above the radar device 60. The radar device 60 is attached to the support frame 40 via the radar stay 70. For operating the orientation adjustment mechanism 54 included in the headlight device 50, the tool T1 is inserted through the insertion opening 35a located below the headlight device 50 so that the tool T1 penetrates the radar stay 70.

This allows a path for inserting the tool T1 to be secured inside the radar stay 70. Thus, the configuration can be downsized.

In the motorcycle 1 of this embodiment, the orientation adjustment mechanism 54 included in the headlight device 50 can be operated by inserting the tool T1 diagonally up to the left or right to the insertion opening 35a.

This allows the orientation adjustment mechanism 54 to be properly operated even when the middle portion of the space into which the tool T1 can be inserted is substantially necked due to the shape or arrangement of other members.

In the motorcycle 1 of this embodiment, the orientation adjustment mechanism 54 included in the headlight device 50 can adjust the direction of the light source 55 in three dimensions by adjusting the direction around the first axis in the vertical direction and adjusting the direction around the second axis in the vehicle width direction.

This allows for good adjustment of the direction of the light source 55.

In the motorcycle 1 of this embodiment, the orientation adjustment mechanism 54 included in the headlight device 50 has the first adjustment member 58a and the second adjustment member 59a. The first adjustment member 58a is operated to change the direction of the light source 55 around the first axis. The second adjustment member 59a is operated to change the direction of the light source 55 around the second axis. The second adjustment member 59a is located opposite the first adjustment member 58a across the centerline in the width direction of the headlight device 50.

This allows for a simplified structure.

In the motorcycle 1 of this embodiment, the orientation adjustment mechanism 54 of the headlight device 50 includes the adjustment members 58a, 59a for being operated to adjust. The orientation adjustment mechanism 64 of the radar device 60 includes the adjustment members 68a, 69a for being operated to adjust. The adjustment members 58a, 59a, 68a, 69a are all located in the interior space of the front cowl 34 connected to the outside via the insertion opening 35a.

Therefore, the respective orientation adjustment mechanisms 54, 64 can be operated from the outside via the insertion opening 35a to perform the adjustment.

The motorcycle 1 of this embodiment has a positioning mechanism for positioning the jig 100 (the second mounting portion 72 and the boss portion 96). The jig 100 guides the tool T1 that is inserted into the insertion opening 35a.

This allows the tip of the tool T1 to be guided to the exact location for operation even if the orientation adjustment mechanism 54 is far away from the insertion opening 35a, by guidance of the jig 100 that is precisely positioned. In addition, the tool T1 can be prevented from hitting other peripheral members such as adjustment members 68a, 69a and damaging them.

The motorcycle 1 of this embodiment includes the headlight device 50 that can adjust the direction of the light source 55.

This allows the orientation adjustment of the headlight device 50 to be achieved with a simple configuration.

The motorcycle 1 of this embodiment includes the front fender 18. The insertion opening 35a is located lower than the headlight device 50, is located lower than the radar device 60, and is located higher than the front fender 18. At least a portion of the insertion opening 35a faces the front fender 18 in a vertical direction.

This allows the orientation adjustment of the headlight device 50 by effectively utilizing the space near the front fender 18.

In this embodiment, the following method is used to adjust the orientation of the light source 55 in the headlight device 50 and to adjust the orientation of the radar device 60. That is, the insertion opening 35a is formed in the motorcycle 1. The orientation adjustment mechanism 54 included in the headlight device 50 and the orientation adjustment mechanism 64 included in the radar device 60 are operated by being accessed through the same insertion opening 35a.

This simplifies the configuration and prevents a reduction in mechanical strength compared to providing separate openings for each of the headlight device 50 and the radar device 60. In addition, the orientation adjustment work of the headlight device 50 and the radar device 60 can be easily performed together, for example, at the time of factory shipment of the motorcycle 1.

Although the preferred embodiment and the modifications of the present invention have been described above, the configurations described above may be modified as follows, for example.

The radar device 60 may be disposed above the headlight device 50.

The insertion opening 35*a* is not limited to being located below with respect to the headlight device 50 and the radar device 60, but may be located above or to the side, for example. The insertion opening 35*a* may be formed in the cowl or in a member that is neither the partition member 35 nor the cowl.

Instead of or in addition to the radar device 60, another device with an orientation adjustment mechanism may be disposed. Another device could be, for example, a camera. The camera can be located above or below the headlight device 50.

Instead of the headlight device 50, the invention can be applied to a lighting device that illuminate areas other than the front of the ride.

At least any of the orientation adjustment mechanisms in the headlight device 50 and the radar device 60 may be adjustable for direction in a plane rather than in three dimensions.

For example, the radar device 60 may be equipped with an adjustment mechanism that allows position adjustment instead of direction adjustment.

The above embodiment describes an example in which the invention is applied to the motorcycle, but the invention can also be applied to other saddle vehicles. Other saddle vehicles include, for example, a vehicle with two front wheels and one rear wheel, a vehicle with one front wheel and two rear wheels, a vehicle with two front wheels and two rear wheels, or the like. Examples of four-wheeled vehicles include an all terrain vehicle for driving on a wide variety of terrain, mainly unpaved terrain. Furthermore, the present invention can also be applied to rides other than vehicles, including watercraft (PWC: Personal Water Craft) or the like for example.

The invention claimed is:

1. A ride, comprising:
a first device including an adjustment mechanism; and
a second device including an adjustment mechanism,
wherein any one of the first device and the second device is a lighting device in which a direction of a light source of light is adjustable,
wherein an opening is formed,
wherein the adjustment mechanism of the first device and the adjustment mechanism of the second device can be operated by being accessed from outside through the same opening, and
wherein the first device and the second device are lined up in a vertical direction.

2. A ride according to claim 1, wherein the ride includes a guide that guides a tool inserted into the opening to the adjustment mechanism included in the first device.

3. A ride according to claim 1, wherein the opening is disposed lower than the first device and lower than the second device, and wherein the opening is open downward.

4. A ride according to claim 1, further comprising:
a frame;
wherein the first device is located above the second device,
wherein the second device is attached to the frame via a stay, and
wherein for operating the adjustment mechanism included in the first device, a tool is inserted through the opening located below the first device so that the tool penetrates the stay.

5. A ride according to claim 1, wherein the adjustment mechanism included in the first device can be operated by inserting a tool diagonally up to right or diagonally up to left with respect to the opening.

6. The ride according to claim 1, wherein the adjustment mechanism included in the first device is an orientation adjustment mechanism which can adjust a direction in three dimensions by adjusting the direction around a first axis in a vertical direction and adjusting the direction around a second axis in a ride width direction.

7. The ride according to claim 6, wherein the orientation adjustment mechanism of the first device includes:
a first adjustment member operated to change the direction around the first axis; and
a second adjustment member operated to change the direction around the second axis, and
the second adjustment member is located opposite the first adjustment member across a centerline in a width direction of the first device.

8. The ride according to claim 1, wherein the adjustment mechanism of the first device has a first operation member for being operated to adjust, wherein the adjustment mechanism of the second device has a second operation member for being operated to adjust, and wherein the first operation member and second operation member are located at an interior space connected to the outside via the opening.

9. The ride according to claim 1, further comprising:
a positioning mechanism configured to position a jig that guides a tool inserted into the opening.

10. A saddle vehicle, comprising:
a ride according to claim 1,
wherein the first device is a headlight device.

11. The saddle vehicle according to claim 10, further comprising:
a fender;
wherein the opening is located lower than the first device, is located lower than the second device, and is located higher than the fender, and
wherein at least a portion of the opening faces the fender in a vertical direction.

12. An adjustment method in a ride, comprising:
a first device including an adjustment mechanism; and
a second device including an adjustment mechanism,
wherein any one of the first device and the second device is a lighting device in which a direction of a light source of light is adjustable,
wherein an opening is formed in the ride,
wherein the adjustment mechanism of the first device and the adjustment mechanism of the second device are operated by being accessed from outside through the same opening, and
wherein the first device and the second device are lined up in a vertical direction.

* * * * *